Nov. 8, 1966  R. H. BRUNNER  3,284,039
MOVE ABOUT FLOWER POT
Filed Aug. 9, 1965
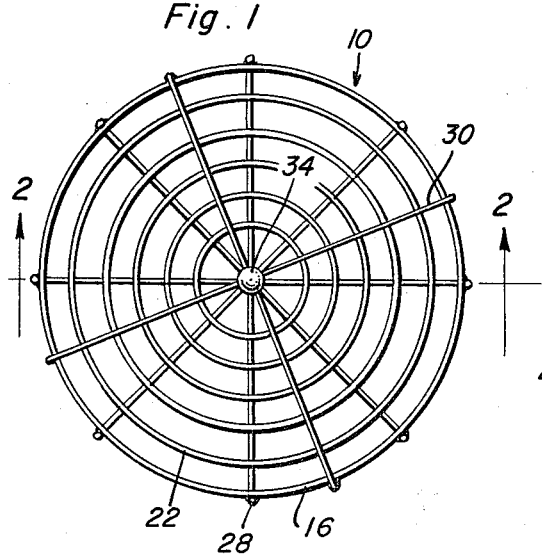
Fig. 1
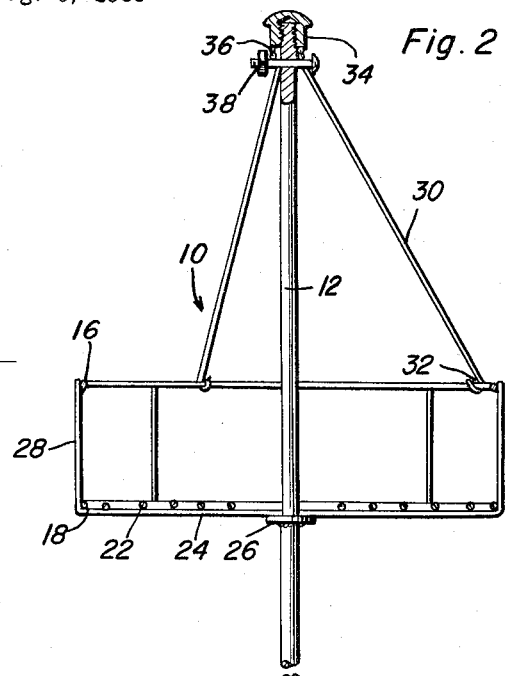
Fig. 2
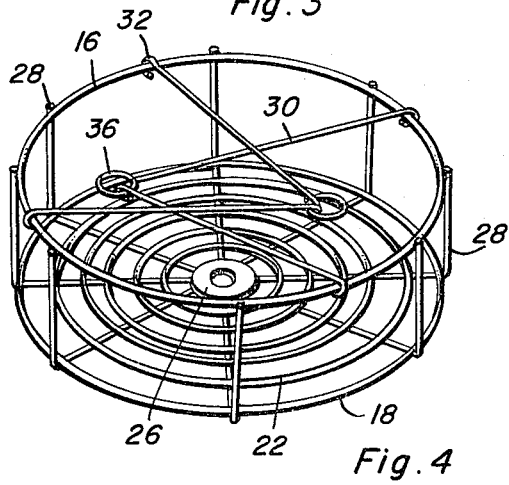
Fig. 3
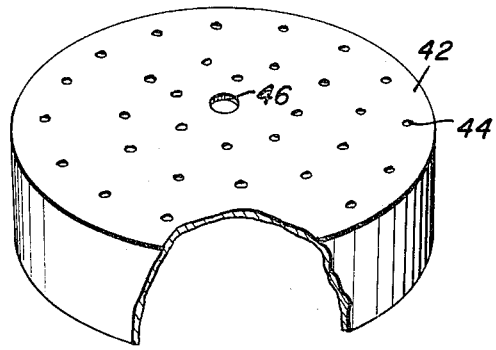
Fig. 4
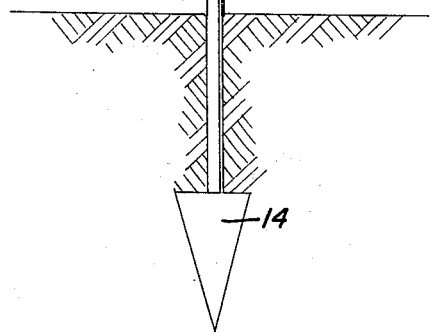
INVENTOR
Reuben H. Brunner

United States Patent Office 3,284,039
Patented Nov. 8, 1966

3,284,039
MOVE ABOUT FLOWER POT
Reuben H. Brunner, Rte. 1, Alexandria, Ohio
Filed Aug. 9, 1965, Ser. No. 478,098
3 Claims. (Cl. 248—153)

The present invention generally relates to a flower pot holder and more particularly to such a holder which is easily movable from place to place and at the same time quickly and securely anchored in place by employing a ground inserted rod.

An object of the present invention is to provide a flower pot holder having a basket-like structure for supporting a plurality of flower pots.

Another object of this invention is to provide a flower pot holder adapted to receive an insert having a plurality of apertures therein for receiving flower stems and the like.

A further object of this invention is to provide a flower pot holder constructed of relatively inexpensive wire rod, easily disassembled and assembled to enable compact storage and shipment, attractive in appearance while yet quite effective for its purposes and long lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the flower pot holder of this invention;

FIGURE 2 is a sectional view taken generally along section line 2—2 of FIGURE 1 showing the structural details of the holder;

FIGURE 3 is a perspective view of the basket structure; and

FIGURE 4 is a perspective view, with parts broken away, illustrating an insert for holding flower stems or the like.

Referring now specifically to the drawings, numeral 10 generally designates the flower pot holder of the present invention which is supported from the ground surface by the use of an elongated rod or pipe 12 having a triangular or tapered pointed ground inserted plate 14 on the lower end thereof which permits easy movement of the holder to a desired location and prevents unwanted twisting of the holder about the longitudinal axis of rod 12.

A basket-like structure is mounted on rod 12 and includes a top annular wire rod or ring 16, a lower ring 18 of the same diameter disposed below ring 16. Inwardly of ring 18, there is a plurality of concentric rings such as 22 with an innermost ring 26 being in the form of a washer fixed to the rod 12 or slidably received thereon for ease of disassembly.

The outer rings 16 and 18 are rigidly interconnected by a plurality of circumferentially spaced vertical rods 28 which continue under rings 18 and 22 to the ring or washer 26 as designated by numeral 24 thus forming a rigid wire rod basket with all intersecting wire rods being fixedly interconnected as by welding or the like.

Extending upwardly from the wire ring 16 are two pair of converging rods 30 having loops 32 at the lower ends pivotally engaged on ring 16. The upper ends of rods 30 in each pair are interconnected by a wire ring or loop 36 adapted to fit over rod 12 below a screw threaded cap 34 on the upper end of rod 12. The wire rings 36 rest on a transverse bolt 38 through rod 12 thus detachably supporting the basket from the rod 12 in a detachable manner.

An insert 42 as shown in FIGURE 4 of generally cylindrical configuration is provided for the basket. The insert includes a depending wall and a central aperture 46 for receiving rod 12 and plurality of randomly arranged holes 44 for receiving flower stems or the like.

Six concentric wire rods 22 forming the bottom are preferable to prevent tilting of flower pots. A washer or flange may be rigidly fixed to the rod 12 to aid in or to form the sole support for the basket.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flower pot holder comprising an elongated support rod, means on the lower end of said rod for penetrating into the ground surface, and a basket structure mounted on said rod, said basket including upwardly converging rods, adjacent converging rods having a joining ring at the upper end thereof removably supported from the upper end of said support rod thus enabling removal of said basket, said means on the lower end of the support rod including a generally triangular plate to penetrate the ground and to prevent rotation of the support rod, said basket including an upper wire ring, a lower wire ring spaced vertically below the upper ring, a plurality of concentric wire rings spaced progressively radially inwardly from said lower ring with the inner-most ring being in the form of a washer slidable on said support rod, and a plurality of radial rods interconnecting said concentric rods, the outer ends of said radial rods being upturned and interconnecting the lower and upper rods.

2. The combination of claim 1 wherein rod includes a transverse bolt forming a support of the rings interconnecting the converging rods.

3. The combination of claim 1 together with an insert substantially filling the basket, said insert having a plurality of small holes therein for receiving artificial flower stems.

References Cited by the Examiner

UNITED STATES PATENTS

| | | | |
|---|---|---|---|
| 353,131 | 11/1886 | Greenwood | 248—318 |
| 941,448 | 11/1909 | Haglund | 248—318 |
| 963,057 | 7/1910 | Muschenheim | 47—41.13 |
| 999,202 | 8/1911 | Browning | 248—146 |
| 1,162,575 | 11/1915 | Craig | 248—153 |
| 1,196,312 | 8/1916 | Stuck | 47—41.13 |
| 1,719,695 | 7/1929 | Ferguson | 248—156 X |
| 2,448,563 | 9/1948 | Wetzel | 248—122 |
| 2,861,764 | 11/1958 | Fisher | 248—146 |
| 3,143,817 | 8/1964 | Paulson | 248—156 X |
| 3,169,742 | 2/1965 | Smith | 248—146 |

FOREIGN PATENTS 21,220   10/1898   Great Britain.

CLAUDE A. LE ROY, *Primary Examiner.*